(12) United States Patent
Gottschlich et al.

(10) Patent No.: US 9,475,440 B2
(45) Date of Patent: Oct. 25, 2016

(54) ELECTRICAL CONNECTION CONSOLE FOR MOTOR VEHICLE ON-BOARD ELECTRICAL SYSTEM CONDUCTOR

(71) Applicant: Auto-Kabel Management GmbH, Hausen i.W. (DE)

(72) Inventors: Heinz-Georg Gottschlich, Erkelenz (DE); Martin Schloms, Aachen (DE)

(73) Assignee: Auto-Kabel Management GmbH, Hausen i.W. (DE)

(*) Notice: Subject to any disclaimer, the term of this patent is extended or adjusted under 35 U.S.C. 154(b) by 0 days.

(21) Appl. No.: 15/030,636

(22) PCT Filed: Aug. 26, 2014

(86) PCT No.: PCT/EP2014/068039
§ 371 (c)(1),
(2) Date: Apr. 20, 2016

(87) PCT Pub. No.: WO2015/058887
PCT Pub. Date: Apr. 30, 2015

(65) Prior Publication Data
US 2016/0250984 A1    Sep. 1, 2016

(30) Foreign Application Priority Data

Oct. 25, 2013    (DE) .................. 10 2013 017 660

(51) Int. Cl.
*H02G 3/06* (2006.01)
*B60R 16/033* (2006.01)
*H02G 3/08* (2006.01)

(52) U.S. Cl.
CPC ............ *B60R 16/033* (2013.01); *H02G 3/06* (2013.01); *H02G 3/08* (2013.01)

(58) Field of Classification Search
CPC ........ H02G 3/06; H02G 3/08; H02G 3/0616; H02G 15/00; H02G 15/007; B60R 16/033; B60R 16/03; H01R 4/01; H01R 4/023; H01R 4/029; H01R 4/02; H01R 4/62; H01R 43/02; H01R 4/70; H01B 7/00; H01B 7/0009

USPC ....... 174/68.1, 68.3, 72 A, 71 B, 73.1, 74 R, 174/75 R, 84 R, 70 C, 88 R; 439/449, 455, 439/458, 466, 775, 865, 883, 884, 887, 439/888; 248/68.1, 49, 73

See application file for complete search history.

(56) References Cited

U.S. PATENT DOCUMENTS 3,956,823 A * 5/1976 Kuo .................. H01R 4/20
                                                  174/94 R
5,349,131 A * 9/1994 Sotani .................. H01F 27/18
                                                  174/74 R (Continued)

FOREIGN PATENT DOCUMENTS

| DE | 10 2006 050 709 B3 | 5/2008 | ............... H01R 4/02 |
| GB | 1 413 321 A | 11/1975 | ............... H01B 7/00 |

(Continued)

OTHER PUBLICATIONS

German Patent and Trademark Office, Office Action—Application No. 10 2013 017 660.3, dated Jan. 30, 2015, 4 pages.

(Continued)

*Primary Examiner* — Angel R Estrada
(74) *Attorney, Agent, or Firm* — Sunstein Kann Murphy & Timbers LLP

(57) ABSTRACT

Electrical connection console for a motor vehicle on-board electrical system comprising a cable 2 having a metallic conductor 4 and an electrical tap 12 connected to the conductor 4 electrically and mechanically. A decentral on-board electrical system structure is facilitated by the tap 12 being formed from a metallic flat part 20 and a metallic connection bolt 12 formed with the flat part 20 in a material bond, and by the flat part 20 being materially bonded to the conductor 4 in a connection region 10 of the conductor 4, wherein the connection region 10 is arranged between the ends of the cable 2.

13 Claims, 5 Drawing Sheets

(56) References Cited

U.S. PATENT DOCUMENTS

Figure 1A:
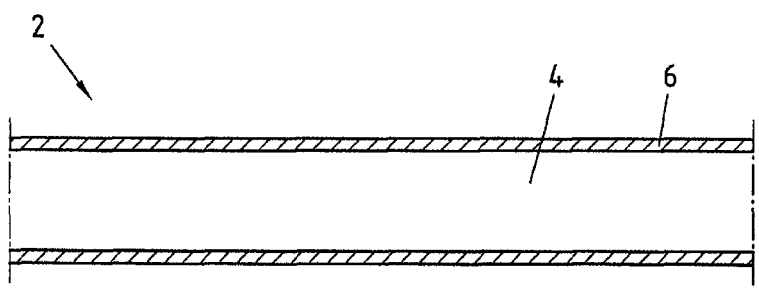

| | | | | |
|---|---|---|---|---|
| 5,393,932 | A | * | 2/1995 | Young .................... H01R 4/027 174/84 R |
| 5,478,008 | A | * | 12/1995 | Takahashi ................ H01R 4/02 228/179.1 |
| 6,369,474 | B1 | * | 4/2002 | Tanaka ................... H01R 4/187 29/860 |
| 7,230,214 | B2 | * | 6/2007 | Kirby ....................... H01R 4/72 174/84 R |
| 7,896,712 | B2 | * | 3/2011 | Cecil ........................ H01R 4/20 439/882 |
| 2007/0029103 | A1 | | 2/2007 | Hanasaki et al. ........... 174/88 R |

FOREIGN PATENT DOCUMENTS

| | | | |
|---|---|---|---|
| GB | 2 330 021 A | 4/1999 | ............... H01R 4/02 |
| WO | WO 2006/082231 A2 | 8/2006 | |

OTHER PUBLICATIONS

International Searching Authority, International Search Report—International Application No. PCT/EP2014/068039, dated Nov. 17, 2014, together with the Written Opinion of the International Search Authority, 9 pages.

European Patent Office, International Preliminary Report on Patentability—International Application No. PCT/EP2014/068039, dated Jan. 21, 2016, 14 pages.

\* cited by examiner

ELECTRICAL CONNECTION CONSOLE FOR MOTOR VEHICLE ON-BOARD ELECTRICAL SYSTEM CONDUCTOR

This application is the national phase entry of international patent application no. PCT/EP2014/068039 filed Aug. 26, 2014 and claims the benefit of German patent application No. 10-2013-017-660.3, filed Oct. 25, 2013, the disclosures of which are incorporated herein by reference in their entirety.

The subject matter relates to an electrical connection console for a motor vehicle on-board electrical system comprising a cable having a metallic conductor and an electrical tap which is connected to the conductor electrically and mechanically. The subject matter additionally relates to the use of such a connection console.

In a motor vehicle on-board electrical system, it is necessary to provide electrical taps to consumers, originating from a main energy lead which is connected directly to the positive terminal of the battery. Due to the plurality of electrical consumers to be connected to the on-board electrical system, an extensive branching of the on-board electrical system conductor is required. Some consumers require large amounts of power from the battery and must therefore be connected to the distribution grid via cables having large conductor cross-sections. Groups of consumers must frequently be fused via a mutual fuse; on the other hand it is also necessary to provide a plurality of respectively fused cable strands, originating from the main energy conductor.

The tap of electrical energy from the main energy conductor is not possible without problems. On the one hand, such a tap is connected respectively to a contact resistance and therefore ohmic losses and, on the other hand, an increased risk of corrosion exists at the taps.

Additionally, in the case of the use of aluminium cables, the electrical tap always poses the risk that the transfer resistance becomes large due to oxidation of the aluminium conductor and the electrical power loss to this transfer resistance leads to an undesired heating of the conductor.

Based on these problems, the object of the subject manner is to provide an electrical connection console with which a decentral on-board electrical system topology is enabled.

The object is solved by an electrical connection console according to claim 1. In particular in motor vehicle on-board power supplies, preferably in those in which the battery is arranged in the rear of the vehicle and the drive unit, in particular the starter of the combustion engine, but also possibly an electromotor for the drive, is arranged in the engine compartment, the main battery conductor runs from the rear to the front of the vehicle. This can occur using an underfloor installation of the battery conductor or also by an interior installation of the battery conductor. A plurality of electrical taps can be achieved in a particularly simple manner with the aid of the connection console of the subject matter.

In particular if the battery conductor is made from an aluminium conductor, in particular an aluminium solid conductor, it is problematic to arrange connection consoles on such conductors. With the aid of the solution of the subject matter, it is possible to arrange a metallic flat part, having a metallic connection bolt formed in a material bond with the flat part, on the metallic conductor in a non-insulated region, in particular in a central region of the cable which is spatially apart from the conductor ends. For this purpose, an electrical tap is formed by the metallic flat part and the connection bolt. The flat part is materially bonded to the conductor in the connection region. The connection region lies between the ends of the cable and is preferably arranged in a central region of the cable. In particular, the connection region lies at a spatial distance from the distal ends of the cable. Due to the materially bonded arrangement of the flat part on the conductor, an enlarged connection surface can be achieved, via which a sufficiently high current flow with low electrical losses is possible.

In particular, the conductor of the electrical cable is insulated and the conductor is stripped of the insulation in the connection region. Therefore, the connection region lies between two insulated regions of the conductor. According to one embodiment, the flat part can be materially bonded to the conductor in this stripped region. If several stripped regions are provided, one or more connection consoles can be provided along the course of the cable, via which the electrical taps are possible. In particular if the cable is one from the main battery conductor, a plurality of electrical taps can therefore be enabled on the battery conductor without negatively influencing the conductance of the battery conductor as such by otherwise necessary interruptions. The taps do not lead to an increased electrical power loss along the cable since the cable is not interrupted by the taps.

The tap, or rather the metallic flat part thereof, can be connected to the conductor of the cable by means of a material bond. The cable hereby remains intact and its conductance is substantially not influenced. Therefore, it is possible to lead a one- or two- or multi-piece cable from the battery to the engine compartment, in particular to the starter or to the electromotor in the engine compartment, said cable not being influenced or only being marginally influenced in its electrical conductivity of a respective section by taps. The insulation of the cable is such that this completely surrounds the conductor in the insulation sections. The insulation is preferably formed from a non-conductor, in particular a plastic, such as PVC or silicone.

According to one exemplary embodiment, it is proposed that the electrical conductor is a round conductor. Preferably, the electrical conductor is thereby inflexible and therefore not plastically deformable due to, in particular, its own weight force. It is also proposed that the conductor is formed from aluminium or an alloy thereof. In particular E-aluminium, for example aluminium 99.5. can be used for the conductor.

In order to be able to design the connection surface between the flat part and the conductor in the connection region to be as extensive as possible, it is proposed that the conductor has a flat region in the connection region. In particular, a planum of the conductor is formed in the connection region, on which the flat part can be arranged in a material bond. This flat region is, according to one embodiment, produced using cut or uncut forming. In particular a compression or pressing, in particular a radial compression or pressing, can be used to form the flat region of the conductor. Preferably, the forming can occur directly during a joining process between the conductor and the flat part. Therefore, for example, during welding by means of, for example, ultrasound, the sonotrode and the anvil can be used both to weld the components and to simultaneously form the planum by compression. Friction spot welding is also possible, wherein here the welding tools can simultaneously enable the welding and the forming.

The firm connection of the flat part to the conductor is, in particular, then simplified if this is formed from a solid material. Contrary to the case of stranded conductors, the conductor made from solid material is in one piece and welding, in particular by means of ultrasound, is favoured since then individual strands cannot be brought into vibration, whereby the welding energy could be compensated for. Rather, in the case of a solid material during welding, the entire welding energy is introduced into the contact surface between the flat part and the conductor in the connection region and the materials fuse.

Depending on the use of the material of the conductor, preferably the flat part is formed from an electrically similar, in particular the same, metallic material. If the conductor, for example, is formed from copper or an alloy thereof, the flat part can likewise be formed from copper. Since, however, in particular in the case of the use of aluminium, the connection console of the subject matter is advantageous, according to one embodiment it also is proposed that the flat part is formed from aluminium or alloys thereof Due to the use of an electrically similar or the same metal for the conductor and the flat part, a type-pure connection is ensured in the region of the connection console between the tap and the conductor. Contact corrosion is therefore prevented or reduced to a minimum.

On the other hand, the connection console is conceived to provide an electrical tap. This tap is used by cables outgoing from the tap. These can, for example, be formed from copper. In order to facilitate the electrical tap at the connection console, it is proposed that the connection bolt can be formed from copper or alloys thereof. A tap to an electrical contact part made from aluminium is also possible, however, such that then the connection bolt can likewise be formed from aluminium.

The contact corrosion between the flat part made from aluminium and the connection bolt can thereby be reduced by the connection bolt being formed from steel or stainless steel. In this case, the contact corrosion between the connection bolt and the flat part is negligible. The contact point between the connection bolt and the flat part can be protected from environmental influences, in particular from water, by suitable insulation measures, and therefore the risk of corrosion can be reduced.

In order to equip the connection bolt for connection to a cable lug or another cable end, it is proposed that this is tin-plated and/or underlaid with nickel.

A particularly good connection between the flat part and the conductor is then possible if this is produced by means of ultrasonic welding. Due to the ultrasonic welding, a potentially present aluminium oxide layer on the conductor is broken up and the resulting welded spot is free of aluminium oxide as far as possible. The transfer resistance in the region of the welded spot is hereby reduced compared to conventional welding methods.

According to one embodiment, it is proposed that the connection bolt is connected to the flat part by means of friction welding, in particular rotational friction welding or friction spot welding, but also by means of electric welding. A potentially present aluminium oxide layer on the flat part can likewise be broken up by the friction welding of the connection bolt to the flat part and the transfer resistance between the flat part and the connection bolt can be kept small.

According to one embodiment it is proposed that the flat part is materially bonded to the conductor on the side facing away from the connection bolt. Therefore, the conductor can be materially bonded to the flat part on the one side of the flat part and the connection bolt on the other side of the flat part. Since the conductor on the side facing away from the connection bolt is connected to the flat part, the conductor does not prevent the connection of an electrical connection to the connection bolt. The tapping direction of an electrical connection to the connection bolt is therefore freely selectable and can in particular occur in an angular manner as well as parallel to the course of the conductor.

According to one embodiment, it is proposed that the flat part, parts of the bolt and the conductor, are coated with an insulation. In particular the insulation is such that it not only surrounds the flat part, parts of the bolt and the conductor, but projects beyond the insulation of the conductor. Thuse, a complete enclosure of the flat part, of the part of the bolt and of the conductor is enabled. The entry of moisture is prevented as far as possible by the insulation. The transfers between the conductor and the flat part, or rather between the flat part and the connection bolt, are hereby protected from moisture from the surrounding environment.

In order to enable an electrical connection to the connection bolt, the connection bolt is stripped from the insulation at its end which is spatially apart from the flat part. It is possible that the insulation in the region of the bolt is such that it is formed to receive a seal, in particular in the form of a cap. Thus, the end of the bolt can be covered with an insulation cap, and in the event that a connection to the bolt should occur, the cap can be removed.

In order to prevent incorrect polarities during the installation of the on-board electrical system and in particular to contact the correct bolts for the respective taps, it is proposed that the insulation is mechanically coded in a poka-yoke manner in the region of the end of the connection bolt which is spatially apart from the flat part. Due to a certain shape of the periphery of the insulation of the bolt in the region of the end which is spatially apart from the flat part, it can be ensured that only certain types of connection plugs can be connected to the bolt. Provided, for example, the inner periphery of a plug is not congruent to the outer periphery of the insulation at the bolt, a plug connection can be prevented. Incorrect connections can hereby be prevented. In particular, the coding occurs by shaping of the outer periphery of the insulation in the region of the end of the bolt.

In order to be able to fix the connection console, for example, in a receiver within the vehicle body, it is proposed that an edge length of the flat part is greater than the diameter of the conductor, in particular greater than the diameter of the cable. In particular, square as well as rectangular shapes of the flat part have proven to be advantageous.

The connection bolt of the subject matter can be used in particular in energy conductors, for example battery conductors, in particular high-current conductors, in particular motor vehicle battery conductors.

Figure 1B:
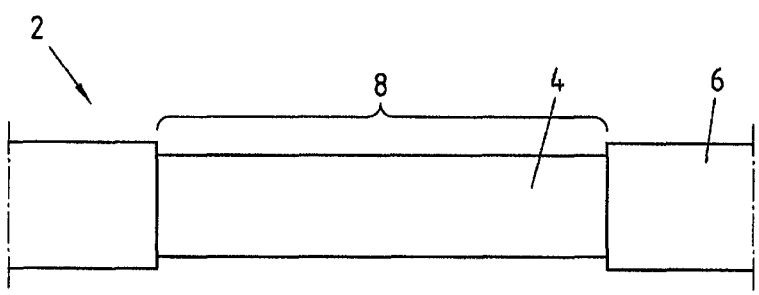
Figure 1C:
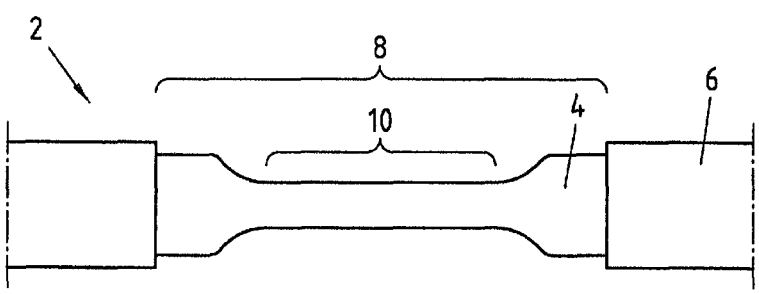
Figure 2:
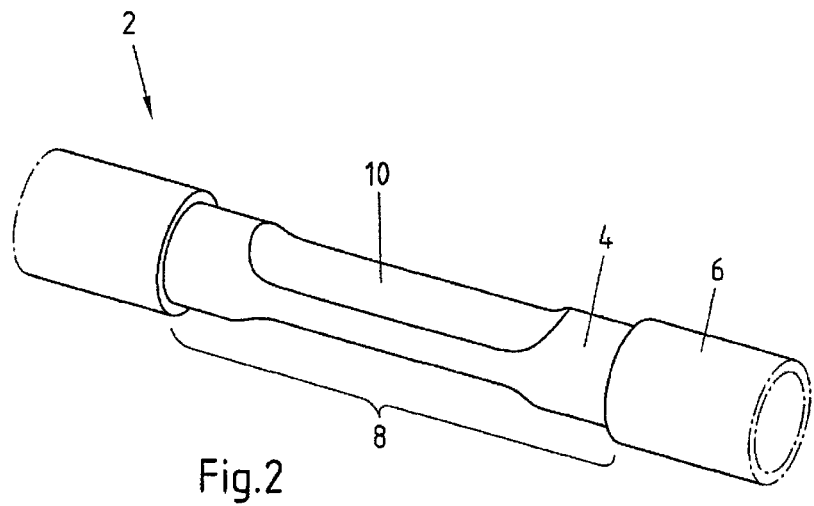
Figure 3A:
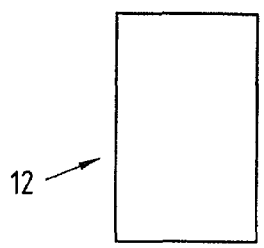
Figure 3B:
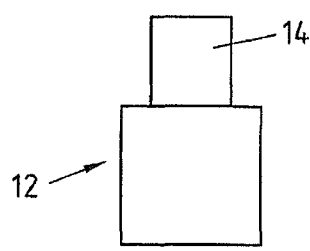
Figure 3C:
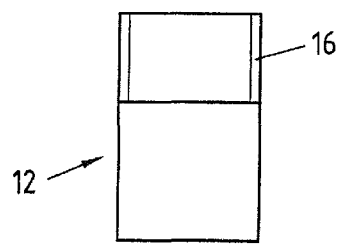
Figure 3D:
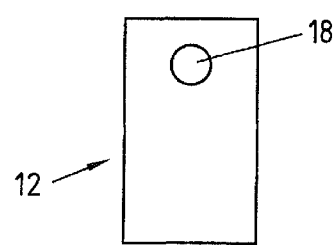
Figure 4:
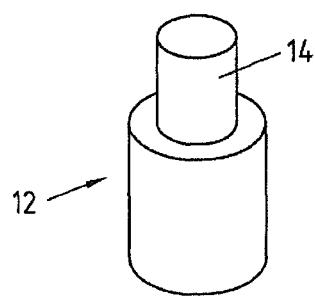
Figure 5A:
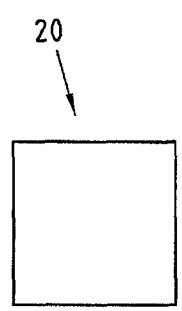
Figure 5B:
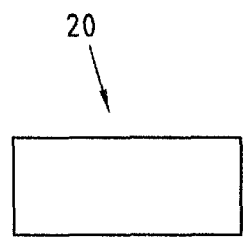
Figure 5C:
Figure 6:
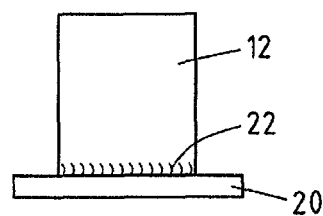
Figure 7:
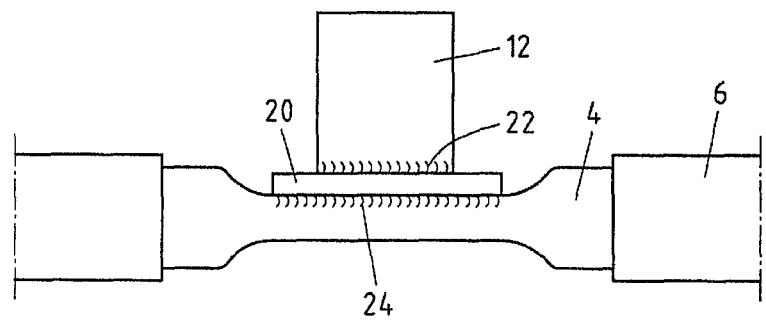
Figure 8:
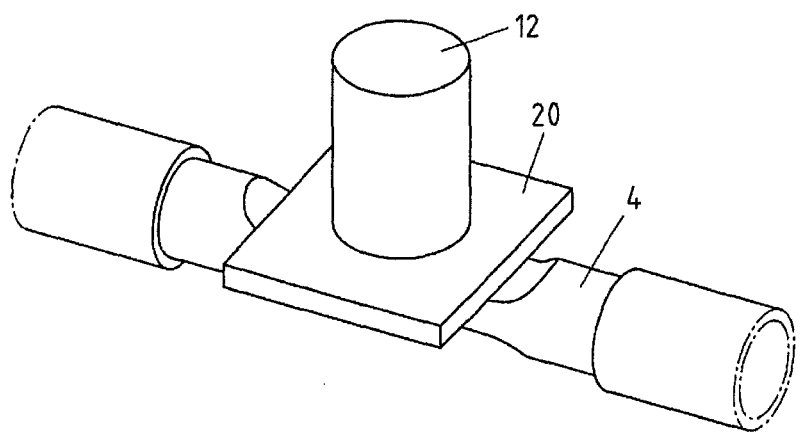
Figure 9:
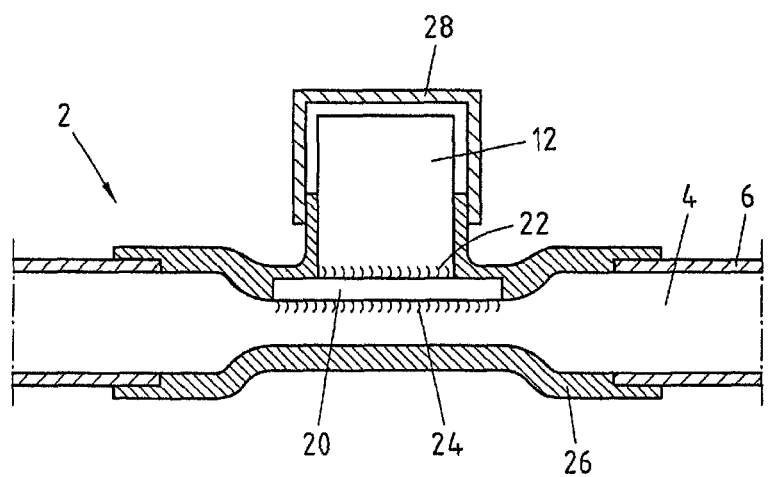
Figure 10:
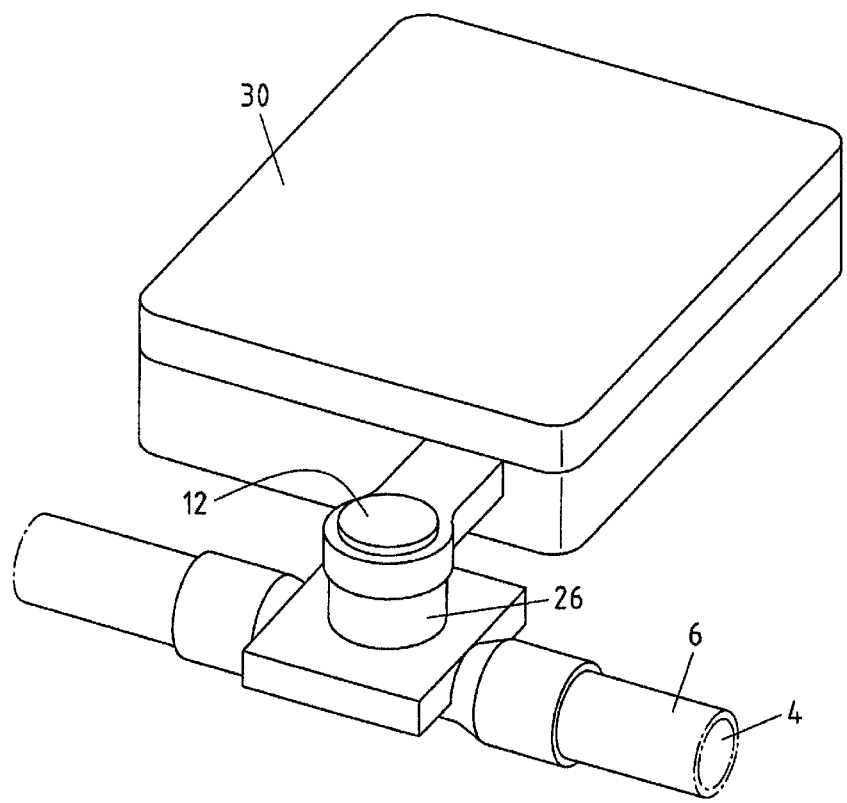
Figure 11A:
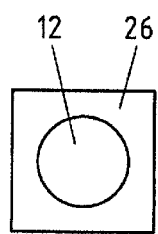
Figures 11B, 11C:
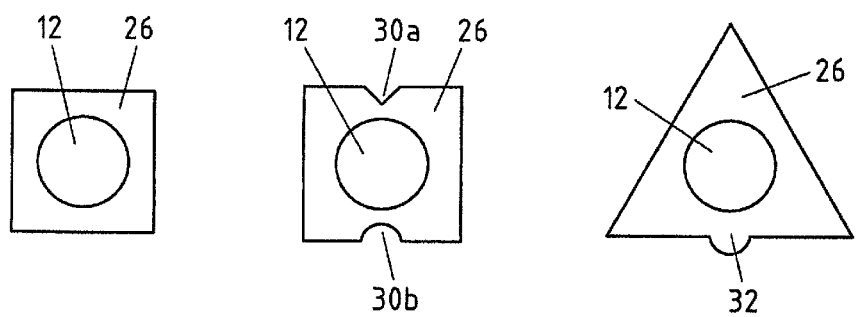

In the following, the subject matter is explained in more detail by means of drawings showing exemplary embodiments. In the drawings are shown:

FIG. 1a a cross-section of a cable;

FIG. 1b a view of a stripped cable;

FIG. 1c a view of a stripped, compressed cable;

FIG. 2 a view of a cable according to FIG. 1;

FIG. 3a a view of a connection bolt according to one embodiment;

FIG. 3b a view of a connection bolt according to a further embodiment;

FIG. 3c a view of a connection bolt according to a further embodiment;

FIG. 3d a view of a connection bolt according to a further embodiment;

FIG. 4 a view of a bolt according to FIG. 3b;

FIG. 5a a top view onto a flat part according to one embodiment;

FIG. 5b a top view onto a flat part according to one embodiment;

FIG. 5c a top view onto a flat part according to one embodiment;

FIG. 6 a view of a flat part connected to a connection bolt;

FIG. 7 a view of a connection console according to one embodiment;

FIG. 8 a view of a connection console according to FIG. 7;

FIG. 9 a cross-section of an insulated connection console;

FIG. 10 a view of a connection console according to FIG. 9 having a fuse box connected thereto;

FIG. 11a a top view onto a mechanical coding of a connection bolt;

FIG. 11b a top view onto a further mechanical coding of a connection bolt;

FIG. 11c a further top view onto a mechanical coding of a connection bolt;

FIG. 1a shows an electrical cable 2 having a metallic conductor 4 and an insulation 6.

The metallic conductor 4 is preferably as a solid material and is, in particular, non-flexible. The conductor 4 is preferably a round conductor. The material of the conductor 4 is preferably aluminium, in particular aluminium 99.5. The non-flexibility of the cable 2 is effected if the cable 2 cannot be deformed plastically due to its own weight force. A greater force than the weight force is necessary in order to bring about plastic deformation of the cable 2.

The insulation 6 is preferably formed from PVC or silicone.

As is depicted in FIG. 1b, in the case of a connection console of the subject matter, the cable 2 is stripped in a central region, in other words removed from its respective distal ends, such that a stripped region 8 is formed. The conductor 4 is free from the insulation 6 in the stripped region 8.

After the stripped region 8 has been produced, the cable 2 or the conductor thereof 4 can be compressed or pressed such that its radius or its diameter is reduced and a flat connection region 10 results, as shown in FIG. 1c. The connection region 10 is suitable to connect the flat part, as is shown below. It is also possible and advantageous that the compression occurs directly during the joining of the conductor to the flat part. Both the material bonding and the compression can thereby occur in one process step.

FIG. 2 shows a view of a cable 2 according to FIG. 1c. It can be recognised that the conductor 4 is a round conductor and is formed to be flat in the region of the connection region 10. This can occur by compression or pressing. The connection region 10 is located in the stripped region 8 which is spatially apart from the distal ends of the cable 2.

FIG. 3a shows a connection bolt 12. The connection bolt 12 shown in FIG. 3a is formed cylindrically and from a solid material. In particular, the connection bolt 12 can be formed from stainless steel. It is, however, also possible to form the connection bolt 12 from copper, aluminium or alloys thereof. The connection bolt 12 can be formed by rotation or by cutting of a rod.

FIG. 3b shows a connection bolt 12 which has a terminal lug 14 on its one end to which, for example, a clamp element of an electrical connection can be clamped. In particular, for example, a clamp in the form of a battery pole terminal can be clamped to the connection lug 14.

FIG. 3c shows a connection bolt 12 in the case of which an end is provided with a thread 16. An electrical connection, for example, can be screwed to such a connection bolt 12.

FIG. 3d shows a further connection bolt 12 which has an opening 18 on its end, in particular in the form of a bore. For example, a screw connection with an electrical connection can be produced by this opening 18, in which electrical connection a screw is pushed through an opening 18 and/or screwed into there.

FIG. 4 shows a connection bolt according to FIG. 3b in one view. It can be recognised that the cylindrical bolt 12 has a smaller radius in the region of the terminal lug 14 and, for example, is formed to receive a clamp element.

FIG. 5a shows a top view onto a flat part 20. The flat part 20 is preferably formed from the same material as the conductor 2. Preferably, the flat part 20 is formed from aluminium or alloys thereof, in particular from aluminium 99.5. It can be recognised in FIG. 5a that the flat part 20 has a square cross-section.

As can be recognised, however, in FIG. 5b, the cross-section of the flat part 20 can also be rectangular.

An oval cross-section, as shown in FIG. 5c, is also possible. Round cross-sections or other cross-sectional shapes of the flat part 20 are likewise possible and can be adapted depending on the purpose of use of the connection console.

FIG. 6 shows one view of a flat part 20 with a bolt 12 welded thereto. The bolt 12 is preferably welded to the flat part 20 by means of rotational friction welding and it forms a weld seam 22 between the bolt 12 and the flat part 20. The weld seam 22 is preferably free from aluminium oxide and the transfer resistance between the bolt 12 and the flat part 20 is in the range of a few μ Ohm.

FIG. 7 shows the connection of the flat part 20 to the conductor 4. It can be recognised that the flat part 20 already connected to the bolt 12 is materially bonded to the conductor 4. This connection can, for example, be produced by means of an ultrasonic welding method. A weld seam 24 is formed between the flat part 20 and the conductor 4. For ultrasonic welding of the flat part 20 to the conductor 4, it is possible to clamp the bolt 12 into an ultrasonic sonotrode and to press the conductor 4 against the lower side of the flat part 20 by means of an anvil. If the flat part 20 is now impinged with ultrasound, the weld seem 24 is formed between the flat part 20 and the conductor 4. The planum can thereby also be produced. It is therefore not necessary to produce the planum in a preceding process step. An aluminium oxide layer which is formed either on the conductor 4 and/or the flat part 20 is broken up by the ultrasonic welding and the transfer resistance over the weld seam 24 is likewise in the range of a few μ Ohm.

FIG. 8 shows a view of a connection console according to FIG. 7. It can be recognised that the edge length of the flat part 20 is greater than the diameter of the conductor 4. Furthermore it can be recognised that the conductor 4 is welded to the flat part 20 on the side of the flat part 20 facing away from the bolt 12.

In order to protect the weld seams 22 and 24 from environmental influences, the connection console, as shown in FIG. 9, is overmoulded with an insulator 26. The insulator 26 projects beyond the insulation 6 of the cable 2. The insulator 26 at least partially surrounds the flat part 20 as well as the bolt 12 and therefore insulates the weld seams 22, 24 from environmental influences. This is, as depicted in FIG. 9, free from the insulation 26 in the region of the end of the bolt 12 facing away from the flat part 20 A cap 28 can be provided in order to protect the bolt 12 at least temporarily from environmental influences.

FIG. 10 shows a view of an overmoulded connection console according to FIG. 9. In addition to the connection console, a fuse box is depicted in FIG. 10. The fuse box is connected to the connection console, or rather to the bolt 12, via an electrical conductor. The electrical conductor is screwed or clamped to the bolt 12, for example, and therefore offers an electrical connection to the conductor 4. The electrical potential of the conductor 4 is therefore able to be tapped in the fuse box 30 and, from there, outflows can branch off to the consumers.

In order to simplify the connection of consumers to the bolt 12 during assembly and in particular to prevent electrical taps being provided to the wrong connection bolt 12, the insulator 26 is mechanically coded by shaping in the region of the end of the bolt 12. FIG. 11a shows a mechanical coding in the form of a square. The insulation 26 is formed to be square in the region of the end of the bolt 12 such that, for example, only square plugs or plug faces can be plugged onto the bolt 12.

The mechanical coding of the insulation 26 can, for example, as is depicted in FIG. 11b, also be formed by recesses in the insulator 26. The contour of the recesses can be different such that different mechanical shapings and codings are possible with different recesses.

The periphery of the insulation 26 in the region of the end of the bolt 12 can also be selected differently, for example, as depicted in FIG. 11c, in a triangular shape with a projection 32. Depending on the coding, only suitable plugs can be plugged onto the bolt 12 and therefore it can be ensured that the correct taps are connected to the correct bolts.

A particularly simple electrical tap of an energy conductor is possible with the aid of the shown connection console. The energy conductor as such is hardly influenced electrically and the conductor resistance thereof remains substantially uninfluenced by the number of connection consoles. Furthermore, the connection consoles can be provided at the desired positions along the conductor such that a decentral distribution of the energy in the on-board electrical system is possible. As necessary, several fuse boxes and outflows can be connected to the energy conductor at different points within the vehicle in a particularly simple manner. A packing of the cable is therefore able to be adapted individually and is therefore suitable for the respective vehicle type.

The invention claimed is:

1. Electrical connection console for a motor vehicle on-board electrical system, comprising:
   a cable having a metallic conductor, and
   an electrical tap connected to the conductor electrically and mechanically, wherein
   a flat part is materially bonded to the conductor in a connection region of the conductor, wherein the connection region is arranged between the ends of the cable, and
   the conductor has a flat region, onto which the flat part is arranged, wherein
   the tap is formed from the metallic flat part and a metallic connection bolt welded to the flat part.

2. Electrical connection console of claim 1, wherein, the cable has an insulation of the conductor and the connection region is arranged in a stripped region arranged between two insulation sections of the insulation.

3. Electrical connection console of claim 2, wherein, the insulation completely surrounds the conductor in the insulation sections.

4. Electrical connection console according to claim 1, wherein, the conductor is a round conductor, and/or the conductor is formed from aluminium or an alloy thereof, and/or the flat region is formed by cut or uncut forming, in particular by radial compression of the conductor, and/or the conductor is formed from solid material.

5. Electrical connection console according to claim 1, wherein, the flat part is formed from aluminium or alloys thereof, and/or that the connection bolt is formed from aluminium, copper or alloys thereof, steel or stainless steel, and/or the connection bolt is tin-plated and/or underlaid with nickel.

6. Electrical connection console according claim 1, wherein, the flat part is connected to the conductor by means of ultrasonic welding.

7. Electrical connection console according to claim 1, wherein, the connection bolt is connected to the flat part by means of friction welding, in particular rotational friction welding.

8. Electrical connection console according to claim 1, wherein, the flat part is materially bonded to the conductor on the side facing away from the connection bolt.

9. Electrical connection console according to claim 2, wherein, the flat part, parts of the connection bolt and the conductor are preferably overmoulded with an insulation, in particular coated beyond the insulation of the conductor.

10. Electrical connection console according to claim 2, wherein, the connection bolt is free of the insulation at its end which is removed from the flat part.

11. Electrical connection console according to claim 2, wherein, the insulation is mechanically coded in a poka-yoke manner at least in the region of the end of the connection bolt which is removed from the flat part, in particular that the periphery of the insulation is mechanically coded by shaping in the region of the end of the connection bolt which is removed from the flat part.

12. Electrical connection console according to claim 1, wherein, at least one edge length of the flat part is greater than the diameter of the conductor, in particular greater than the diameter of the cable.

13. Electrical connection console according to claim 12, wherein, the flat part has a square or rectangular shape.

* * * * *